United States Patent
Casellas et al.

(10) Patent No.: US 7,178,237 B2
(45) Date of Patent: Feb. 20, 2007

(54) PISTON FOR A PISTON-CYLINDER ARRANGEMENT, IN PARTICULAR A SHOCK ABSORBER PISTON

(75) Inventors: Antonio Casellas, Siegburg (DE); Ewald May, Bonn (DE)

(73) Assignee: GKN Sinter Metals GmbH, Radevormwald (DE)

( * ) Notice: Subject to any disclaimer, the term of this patent is extended or adjusted under 35 U.S.C. 154(b) by 0 days.

(21) Appl. No.: 10/988,954

(22) Filed: Nov. 15, 2004

(65) Prior Publication Data

US 2005/0145457 A1    Jul. 7, 2005

Related U.S. Application Data

(63) Continuation of application No. 09/834,322, filed on Apr. 13, 2001, now abandoned, which is a continuation of application No. PCT/EP99/07642, filed on Oct. 12, 1999.

(30) Foreign Application Priority Data

Oct. 14, 1998   (DE) ................ 198 47 341

(51) Int. Cl.
*B22D 19/00* (2006.01)
*B23P 15/00* (2006.01)

(52) U.S. Cl. ................ 29/888.047; 29/888.042; 29/888.044

(58) Field of Classification Search ............. 29/888.04, 29/888.042, 888.044, 888.047
See application file for complete search history.

(56) References Cited

U.S. PATENT DOCUMENTS 5,259,294 A * 11/1993 May .................. 92/181 P

FOREIGN PATENT DOCUMENTS

| DE | 34 29 474 A1 | 2/1986 |
|---|---|---|
| DE | 38 125 74 A1 | 10/1989 |
| DE | 44 21 968 A1 | 1/1996 |
| DE | 29 623 140 U1 | 11/1996 |
| DE | 19 707 633 CI | 2/1997 |
| EP | 0 345 561 | 5/1989 |
| EP | 0 658 611 A1 | 6/1995 |
| JP | 61-116 137 | 6/1986 |
| JP | 61-116 138 | 6/1986 |

* cited by examiner

Primary Examiner—Marc Jimenez
(74) Attorney, Agent, or Firm—Woodcock Washburn LLP

(57) ABSTRACT

The invention relates to a piston for a piston-cylinder arrangement, especially a shock absorber piston, comprising a piston body that is fitted with at least one peripheral web on its peripheral surface, wherein a collar-shaped sealing element made of thermoformable plastic material is also formed on the peripheral surface of the piston body in such a way that the web is only formed in part of the height of the material of the collar-shaped sealing element.

6 Claims, 2 Drawing Sheets

PISTON FOR A PISTON-CYLINDER ARRANGEMENT, IN PARTICULAR A SHOCK ABSORBER PISTON

CROSS-REFERENCE TO RELATED APPLICATIONS

Figure 1:
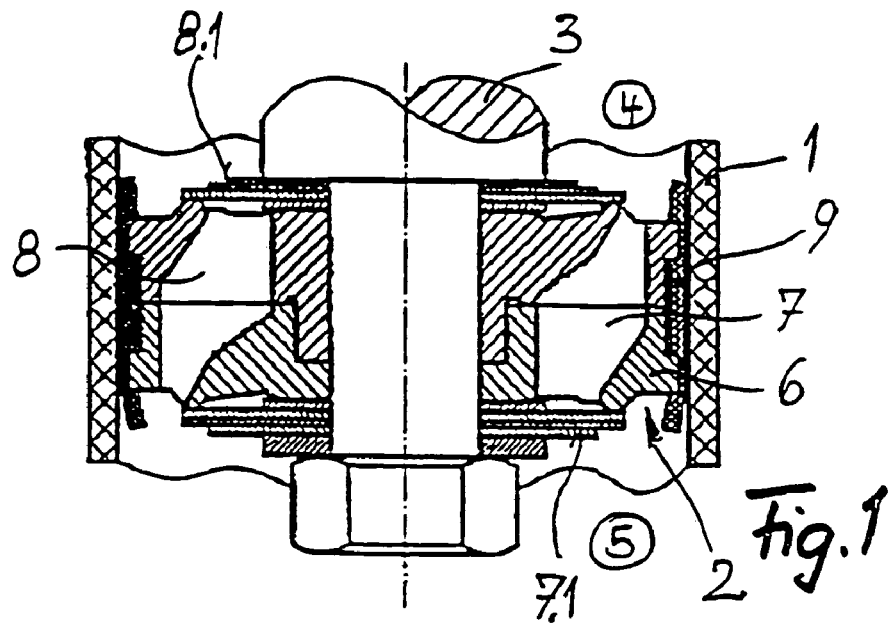

This is a continuation of U.S. application Ser. No. 09/834,322 filed Apr. 13, 2001, which is of a continuation of PCT/EP99/07642, filed Oct. 12, 1999, which claims the benefit of DE 198 47 341 9 filed Oct. 14, 1998, the complete disclosures of which are hereby incorporated by reference in their entirety.

There is a shock absorber piston known from EP-A-0 658 611 that has a piston body that is provided with a peripheral web at its peripheral surface. A number of webs running in the axial direction attach to this peripheral web on one side of it. A seal made of thermoplastic synthetic is sprayed onto this piston body in an injection molding process. The webs extending in the axial direction and the notches between them, which are filled in with sealing material, serve to reliably anchor the sealing material. The seal applied by injection molding enables close tolerancing, which prevents "blow-by" and thus provides a reliable seal of the cylindrical spaces facing one another. The process to produce these types of injection-molded seals is relatively expensive.

There is a piston-cylinder arrangement known from U.S. Pat. No. 3,212,411 whose piston body has a number of peripheral grooves on its peripheral surface. To apply the seal, a cup-shaped preliminary mold made of PTFE (polytetrafluoroethylene) is provided that is first placed on the piston body loosely. The piston body so prepared is then pressed into a forming and calibrating cylinder that is heated to a high temperature. Under the influence of the heat, the PTFE material is pressed into the grooves on the peripheral surface of the piston body. Then, the piston body with the pressed-on seal is cooled in an appropriately designed cooling cylinder. The grooves are completely filled with the sealant material so as to provide a form-locked solid connection of the seal to the peripheral surface of the piston body. When used as a shock absorber piston, the bottom surface of the preliminary mold that still overlaps the end surface of the piston body on one side must then be removed.

There is a shock absorber piston known from EP-A-682 190 whose only essential difference from the processes described above in its manufacture is in that to apply the seal, instead of a cup-shaped preliminary mold, a stamped circular sleeve is used. This circular sleeve is placed on one end of the piston body. The piston body prepared thusly is then pressed into a heated forming and calibrating cylinder, wherein the circular sleeve is placed around the peripheral surface of the piston body as a strip and then pressed into the grooves running in the peripheral direction of the piston body under the influence of heat. Then, the piston with its pressed-on seal is guided through a cooling tube. Here, as well, the sealant material fills the grooves practically completely so that the seal is solidly connected to the peripheral surface of the piston body in form-locked fashion.

The two processes described above have the disadvantage in that considerable pressures are required to shape and to press the sealant material into the grooves on the peripheral surface of the piston body. Also, the sealant material forming the seal is subject to strong shaping forces that disadvantageously influence the structure of the sealant material.

The objective of this invention is to produce a piston, in particular a shock absorber piston, in which the disadvantages described above are avoided.

This objective is met according to the invention by a piston for a piston-cylinder arrangement, in particular a shock absorber piston, with a piston body that is provided with at least one peripherally running web on its peripheral surface. Furthermore, in this piston arrangement, a collar-shaped seal made of a thermoformable plastic material is formed onto the peripheral surface of the piston body such that the web presses into the material of the seal only along a portion of its height. Surprisingly, it has been shown that, in order to get a good seal between the seal and the piston, it is not necessary to arrange a multitude of grooves on the peripheral surface of the piston body. A minimum of one peripheral web is sufficient here, onto which the collar-shaped seal is formed in the manner described in EP-A-682-190. It has also been shown, surprisingly, that it is sufficient for the web to press into the material of the seal only along a portion of its height. On one hand, this results in an acceptable form-lock between the collar-shaped seal and the piston body, and on the other hand, only moderate shaping forces result on the plastic material so that not only do less pressure forces have to be applied, but material flow is also kept to a very minimum during the deformation, thus preventing a disadvantageous influence on the material structure for practical purposes. The web is then located near one end surface of the piston body, preferably the end surface with the higher load.

At higher loads during operation, a useful embodiment of the invention provides that at least two peripheral webs are located on the peripheral surface, the peripheral webs being located on both sides of a notch. This results in a reliable form-locked connection even at higher working pressures. An arrangement with one, or even two peripheral webs can still be produced cost-effectively through machining.

In another advantageous embodiment of the invention, it is provided that each of the edges of the collar-shaped seal extends beyond the end surface of the piston body associated with it. Since the collar-shaped seal is produced according to a known process from a circular sleeve, the phenomenon of "back memory" of the sealant material described in EP-A-0 682 190 can be used to cause the edge around the inner diameter of the circular sleeve to pull inward after it is applied to the piston body, and to cause the edge of the collar-shaped seal produced from the external edge of the circular sleeve to move back outward and in this way to protrude above the rest of the peripheral surface of the collar-shaped seal as a lip seal. If the piston body is installed such that, when used as a shock absorber piston, the piston surface provided with the lip-shaped edge extending outward faces the pressurized side, i.e. the side subjected to the high load, and if the piston surface with the edge that springs back inward is located on the so-called suction side, this results in an improved seal of the piston in the shock absorber cylinder during a pressure load since the hydraulic fluid in the lip-shaped edge presses against the cylinder wall. When it springs back, i.e. for suction loads, the hydraulic fluid can then enter the intermediate space between the piston wall and the cylinder wall to some degree as a result of the minimal play between the two. The fluid can thus find its way up to the edge where the lip-shaped edge of the collar-shaped seal sits against the cylinder wall for the purposes of lubrication. Thus, acceptable lubrication is provided, preventing wear of the seal. Since the flow resistance due to this minimum gap between the sealing surface of the piston and the cylinder wall is considerably higher than the flow resistance through the flow channels in the piston body, practically no drop in performance results.

In an especially advantageous embodiment of the invention, it is provided that at least one web is located in an area adjacent to one end surface of the piston body. In particular, in this geometry, it is useful to provide only two webs, which then sit on both sides of only one notch in the peripheral surface of the piston body lying in between. The webs can be dimensioned to be relatively wide; the notch laterally bordered by the webs can then be twice to three times as wide as the width of a web. This simplifies the contour of the peripheral surface of the piston body considerably.

In an especially advantageous embodiment of the invention, the piston body is pieced together from at least two element sections, each of which has a plane of separation that runs perpendicular to the piston axis. This type of piston body design is suited for manufacture using a powder-metallurgy process, i.e. as a sintered metal part. The form of the two element sections is particularly favorable if each element section has only one peripheral web so that the mirror-imaged element sections pieced together border a notch with their webs. This allows cost-effective manufacture of an [undercut] notch since machining work is not necessary.

Figure 2:
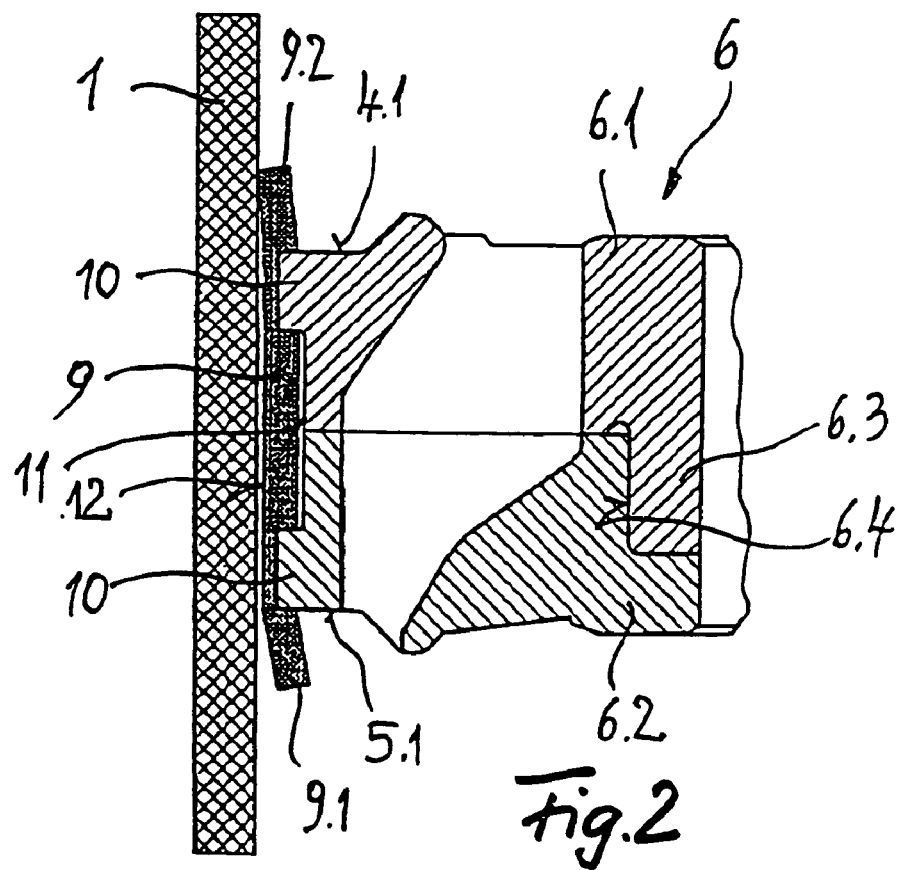
Figure 3:
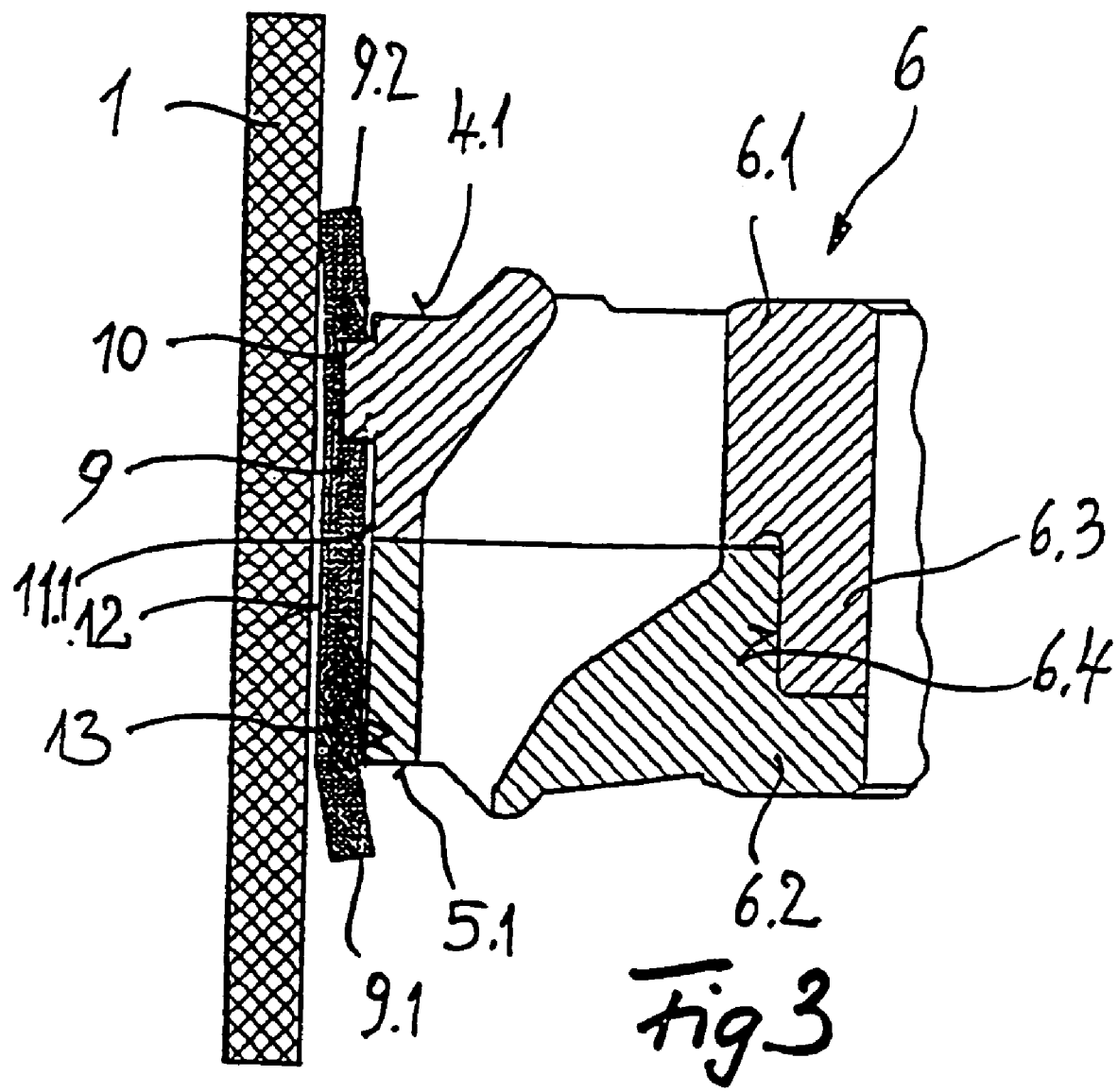

The invention is explained in more detail with the help of schematic drawings of an embodiment example. Shown are:

FIG. 1 a partial section in the axial direction through a piston-cylinder arrangement for a shock absorber, FIG. 2 an enlarged partial section through the piston of the arrangement according to FIG. 1, FIG. 3 an enlarged partial section through a piston with one web.

FIG. 1 shows an axial section through a shock absorber that connects two parts that are movable relative to one another, for example a vehicle axis and a vehicle frame. The shock absorber has a cylindrical part 1 that is connected to one of the two parts that are movable with respect to one another. A piston 2 is guided inside cylinder 1 that is fastened to a piston rod 3 whose free end is fixed to the other part of the parts moving relative to one another. The cylinder 1 is closed on both sides and is filled with a hydraulic fluid so that the piston-cylinder arrangement is designed to be dual-acting, with the piston separating two cylinder spaces 4, 5 from one another.

The piston body 6 of the piston 2 has a number of penetration channels 7, 8 running alongside one another. A throttle valve 7.1 and 8.1 covers the exit side of each of the penetration channels 7, 8. The function of these exits is yet to be explained. This arrangement is designed such that, for example, three penetration channels 7 and three penetration channels 8 are arranged in the shape of a star in alternating fashion around the cylinder axis.

The peripheral surface of the piston 2 is provided with a collar-shaped seal 9 that seals off cylinder space 4 against cylinder space 5. When the piston 2 moves toward cylinder space 4, the fluid is pushed through the penetration channels 7 against the return force of the throttle valve 7.1. The penetration openings 8 are held shut by the pressure of the fluid space 4 acting on the throttle valve 8.1. When it moves in the reverse direction, the penetration channels 7 are closed by throttle valve 7.1, with the fluid now able to flow back through the flowing channels 8 out of cylinder space 5 into cylinder space 4.

FIG. 2 shows a piston 2 in an enlarged representation without the arrangement of the throttle valves 7.1 and 8.1. The piston body 6 is provided with two webs 10 on its peripheral surface, which are arranged in the embodiment example shown such that they also contain a portion of the respective end surface 4.1 or 5.1 of the piston body 6. The two webs border a notch 11 on the peripheral surface of the piston body 6. The arrangement can also be designed such that at least one of the webs 10 is set back somewhat with respect to its associated end surface 4.1 and/or 5.1.

The collar-shaped seal 9 arranged on the peripheral surface of the piston body 6 consists of a thermoplastic synthetic material, preferably PTFE. In the embodiment example shown here, the collar-shaped seal 9 was formed onto the peripheral surface of the piston body 6 by heat forming a circular sleeve, with edge 9.1 of the seal 9 being formed by the inner edge of the circular sleeve and edge 9.2 being formed by the outer edge of the circular sleeve. The width of the circular sleeve was dimensioned such that it was wider than the thickness of the piston body 6 in the axial direction. By doing so, edge 9.1 produced by the inner edge of the circular sleeve is pulled inward after it deforms, whereas edge 9.2 produced by the outer edge of the circular sleeve is bent outward, thus forming a functioning lip seal.

In heat forming the circular sleeve, the webs 10 press into the material of the collar-shaped seal 9 over only a portion of their height so that a certain amount of free space remains between the material of the seal 9 and the bottom of the notch 11. This allows the sealing material to freely flow into the notch 11 without being squeezed when the seal 9 is formed. In this shaping process, the cylindrical exterior surface 13 of the seal 9 is simultaneously calibrated so that the desired tolerances to the inner diameter of the cylinder 1 can be maintained. Since the overall system heats up during operation, especially when these piston-cylinder arrangements are used as shock absorbers, this remaining free space in the base of the notch also allows the sealing material to expand into the notch within certain limits so that the wear of the seal on the peripheral surface of the seal 9 adjacent to the edges is reduced.

As can be seen in FIG. 1 and FIG. 2, the piston body 6 is produced from two element sections 6.1 and 6.2. The shape of the contours of the penetration channels 7 and 8 in one section is identical with that in the other section in the embodiment example shown so that regardless of the arrangement of a bushing 6.3 on element section 6.1 and a corresponding recess 6.4 in element section 6.2, both element sections have the identical external form and are designed without back tapering, which hinders the press process. This makes it possible to form this kind of a piston body 6 from two element sections produced through powder metallurgy, said sections being pressed as element sections from a sinterable metallurgical powder. The pressed element sections are then put together in an assembly operation and then sintered. This is just the kind of manufacturing process that allows the element sections to be produced such that the penetration channels can be formed differently depending on the different flow conditions for suction and pressure loads.

Depending on the manufacturing process, it is also possible to provide more than two webs so that two respective adjacent webs border a notch, resulting in a higher number of notches accordingly.

In FIG. 3, an embodiment form is shown differing in comparison to FIG. 2. The same references apply to the same elements so that reference can be made to FIG. 2 accordingly.

The embodiment form shown in FIG. 3 is provided for cases of minimal suction-pressure load so that the piston body 6 is provided with only one peripheral web 10. In this event, the end surface 4.1 of the piston body 6 is subjected to the higher pressure so that the web 10 is located close to this end surface in this case.

The collar-shaped seal 9 is formed onto the piston body 6 in the manner described above, wherein here, as well, the peripheral web 10 presses into the material of the collar-shaped seal 9 only over a portion of its height.

Due to the "back memory ability" of the plastic material as described above, it inevitably sits against the piston body 6 in the transition region 13 leading to end surface 5.1. In the area near the web 10, at least, a free space or cavity 11.1 remains. This makes it possible that, here as well, the material of the collar-shaped seal 9 can expand into this free space 11.1 under the influence of temperature.

Although it is especially favorable to produce the piston body described here using powder metallurgy, the embodiment according to the invention with only one web, or two webs bordering a notch, can also still be manufactured at reasonable expense by machining.

The invention claimed is:

1. A method for manufacturing a piston for a shock absorber, comprising:

pressing a first and a second element from a sinterable metallurgical powder, the first and second elements each having a web projecting from a peripheral surface thereof;

assembling the first and second elements to form a piston body that defines a notch located between the webs of the first and second elements;

providing a substantially circular sleeve formed from a thermoplastic material and having a width greater than a thickness of the piston body in the axial direction of the piston body;

heat forming the sleeve onto a peripheral surface of the piston body so that the thermoplastic material flows freely into the notch without being squeezed, the webs extend into the sleeve over only a portion of a height of the webs and an amount of free space remains between an inwardly-facing surface of the sleeve and the peripheral surface of the piston body; and calibrating a dimension of an exterior surface of the sleeve while heat forming the sleeve.

2. The method of claim 1, further comprising sintering the first and second elements to form the piston body.

3. The method of claim 1, wherein providing a substantially circular sleeve formed from a thermoplastic material comprises providing a substantially circular sleeve formed from PTFE.

4. The method of claim 1, wherein calibrating a dimension of an exterior surface of the sleeve while heat forming the sleeve comprises maintaining a predetermined tolerance between an outer and an inner diameter of the sleeve.

5. The method of claim 1, wherein heat forming the sleeve onto a peripheral surface of the piston body so that the webs extend into the sleeve over only a portion of a height of the webs and an amount of free space remains between an inwardly-facing surface of the sleeve and the peripheral surface of the piston body comprises heat forming the sleeve onto the peripheral surface of the piston body so that a first edge of the sleeve is pulled inward and a second edge of the sleeve is pulled outward thereby forming a lip seal.

6. The method of claim 1, wherein assembling the first and second elements to form a piston body comprises assembling the first and second elements so that the first and second elements each have a plane of separation that runs substantially perpendicular to an axis of the piston.

\* \* \* \* \*